United States Patent
Hsieh et al.

[11] Patent Number: 5,951,743
[45] Date of Patent: Sep. 14, 1999

[54] METHOD AND APPARATUS FOR FEEDING EXHAUST GASES TO A WET SCRUBBER

[75] Inventors: Tung-Wen Hsieh, Maio-Li; Kuo-Liang Lu; Bii-Junq Chang, both of Hsin-Chu, all of Taiwan

[73] Assignee: Taiwan Semiconductor Manufacturing Co., Ltd., Hsin-Chu, Taiwan

[21] Appl. No.: 08/986,069

[22] Filed: Dec. 5, 1997

[51] Int. Cl.⁶ .................................................. B01D 47/06
[52] U.S. Cl. ................................. 95/224; 96/228; 96/322
[58] Field of Search ....................... 95/149, 224; 96/228, 96/271, 272, 273, 322, FOR 132, FOR 130

[56] References Cited

U.S. PATENT DOCUMENTS

| | | | |
|---|---|---|---|
| 3,210,914 | 10/1965 | Eckert | 95/224 |
| 3,353,334 | 11/1967 | Bergman | 95/224 |
| 3,957,464 | 5/1976 | Teller | 95/224 |
| 4,110,088 | 8/1978 | Cold et al. | 95/224 |
| 4,469,493 | 9/1984 | Tuovinen et al. | 95/224 |
| 5,427,608 | 6/1995 | Auer et al. | 95/224 |
| 5,660,615 | 8/1997 | Neumann et al. | 95/224 |
| 5,738,699 | 4/1998 | Hu et al. | 96/228 |

*Primary Examiner*—Duane S. Smith
*Attorney, Agent, or Firm*—Tung & Associates

[57] ABSTRACT

The present invention discloses an exhaust gas conduit for feeding exhaust gases to a scrubber wherein the conduit is equipped with a self-cleaning device mounted inside the conduit body adjacent to an outlet end of the conduit for dispensing a cleaning solvent onto the inside wall of the outlet end of the conduit such that solid depositions on the inside wall can be avoided. The present invention is also directed to a method for preventing solid depositions in an exhaust gas inlet port to a wet scrubber by utilizing a self-cleaning device mounted in a conduit adjacent to an outlet end of the exhaust conduit and by dispensing a cleaning solvent through the self-cleaning device and spraying the solvent onto an inside wall of the outlet end of the conduit to prevent the formation of solid depositions on the inside wall.

17 Claims, 2 Drawing Sheets

5,951,743

METHOD AND APPARATUS FOR FEEDING EXHAUST GASES TO A WET SCRUBBER

FIELD OF THE INVENTION

The present invention generally relates to a method and apparatus for feeding an exhaust gas to a wet scrubber and more particularly, relates to a method and apparatus for feeding an exhaust gas to a wet scrubber through an exhaust gas conduit that is connected to an inlet port of the scrubber and is equipped with a self-cleaning device mounted inside the conduit body for dispensing a cleaning solvent onto an inside wall of the outlet end of the conduit body thus preventing solid deposition thereon.

BACKGROUND OF THE INVENTION

In various semiconductor fabrication processes, the effluent gases from a process chamber must be treated before they can be released into a factory exhaust system and into the atmosphere. It is known that a large number of reactant gases and their reaction products utilized in the semiconductor fabrication processes are either highly flammable or highly toxic. The spent reactant gases that are discharged out of the process chamber may contain gases that have not been reacted or have been only partially reacted and therefore must be treated before they can be released into the atmosphere.

In a semiconductor fabrication facility, the treatment of the exhaust gases generated from the facility is an important aspect of the total fabrication processes. Various exhaust gases are produced in a semiconductor fabrication facility, these include general exhaust, scrubbed exhaust and solvent exhaust. For discharging the general exhaust and the solvent exhaust, a system typically includes ductworks, exhaust fans, by-passes, and stacks can be used. For handling the scrubbed exhaust, a scrubber must be used for treating the exhaust before they can be released into the atmosphere. A by-pass system can be provided which allows the drawing of outside air when the pressure at the suction side of the blower exceeds a preset value.

In a general exhaust system, heat dissipated by the process equipment is normally removed. The general exhaust therefore does not normally contain acids, caustics or solvents. In a solvent exhaust system air containing solvents from the process equipment is removed. The devices utilized in the exhaust system therefore must be explosion-proof for safety reasons. In the scrubbed exhaust system, air containing acids, caustics and other harmful chemicals from the process chamber is removed. Various caustics in the exhaust gases such as ammonia, silane or other toxic gases must be treated by a scrubber before releasing into the atmosphere. A wet scrubber is normally used to remove acids and caustics in a process chamber exhaust by washing the air with a solvent such as water. City water is adequate for such purpose. The waste water from the scrubber is then sent to a neutralization plant in a waste treatment area of the fabrication facility. A dry scrubber can also be used to remove caustics substances from a process chamber exhaust by absorbing the substances into a scrubber material which is typically maintained at an elevated temperature. The scrubber material can then be replaced when it is saturated with the toxic substances.

The various exhaust systems are connected to process machines via ductworks. For instance, when exhausting from a metal etcher, a chemical vapor deposition chamber or a sputter, spent reactant gases and reaction by-products are normally discharged into a scrubbed exhaust system for treatment before the exhaust can be released to the atmosphere. A typical system for treating exhaust gases from a semiconductor process chamber such as an etcher is shown in FIG. 1.

Referring initially to FIG. 1, wherein a semiconductor fabrication system 10 is shown. The fabrication system 10 consists of an etcher 12, a vent exhaust 14, a main booster pump 16, a dry pump 22, a nitrogen purge gas supply 24 and a wet scrubber 26. Into the metal etcher 12, carrier gases and etchant gases (not shown) are first fed into the chamber through various valve openings (not shown). An inert gas such as pure nitrogen is normally used either as a carrier gas for the etchant gases or as a purge gas when venting of the chamber to atmospheric pressure is needed. In a typical metal etching, application, etchant gases such as $Cl_2$ and $BCl_3$ are used. In a batch-type metal etcher where a plurality of wafers, i.e., 16 wafers in a column type etcher, are etched in a typical etching process. In order to achieve an effective etching rate for a large number of wafers, a high concentration of etchant gas must be utilized in the etch chamber 12. The exhaust gases discharged from the etcher 12 at the outlet port 18 therefore contains a high concentration of un-spent etchant gases and other etching reaction by-products. The vent exhaust 14 is provided for venting of the pure nitrogen used to purge out the etch chamber 12 after an etching reaction. The un-spent etchant gases are discharged out of the etching chamber 12 by the main booster pump 16. A dry pump 22 is subsequently used to deliver the un-spent etchant gases into a wet scrubber 26 through an inlet port 20.

The pump exhaust system 30 which includes the main booster pump 16 and the dry pump 22, and the dry nitrogen source 24 are controlled by a series of valves (not shown). When the valves between the etcher 12 and the main booster pump 16 are opened, exhaust gases exit outlet port 18 and pass through the passageway 28 to enter into the main booster pump 16. The main booster pump 16 acts as the front stage pump and the dry pump 22 acts as the back stage pump, which work together to provide a vacuum that is sufficiently high for the etch chamber 12 prior to an etching process. The exhaust gases exit the dry pump 22 through passageway 34 and enter the wet scrubber 26 through an inlet port 20. During a normal etching process, chamber 12 is first evacuated by the operation of the main booster pump 16 and the dry pump 22 to a suitable vacuum for conducting the etching process. Etchant gases then enter into the chamber to commence the etching process on the wafers. A suitable chamber pressure is maintained during such etching process.

FIG. 2 is a schematic illustrating a detailed view of the exhaust gas conduit 34 and the wet scrubber 26 shown in FIG. 1. It is seen that exhaust gases 38 delivered from the dry pump 22 enter inlet 42 of the exhaust gas conduit 34. The exhaust gas conduit 34 is normally constructed of stainless steel such that it can be maintained at an elevated temperature of approximately 120° C. by the heaters 44 to reduce the potential of particulate depositions in the conduit 34. As the exhaust gases 38 enters the wet scrubber 26 through the inlet port 20, the exhaust gases 38 are washed by a cleaning solvent 48 dispensed from a spray head 50. The cleaning solvent 48 is first supplied from a solvent reservoir (not shown) through conduit 52. A commonly used cleaning solvent for a wet scrubber is city water. After being scrubbed by the cleaning solvent 48, the exhaust gases 38 exit the wet scrubber 26 through an exhaust outlet port 46 into a factory exhaust system (not shown). The spent cleaning solvent 48 is collected by the solvent collection device 54 and then transported through conduit 56 into a spent solvent collection tank 58.

It should be noted that, in the application of a wet scrubber for a metal etcher, the spent water collected in the collection tank 58 is maintained at a pH value between about 6 and about 6.3. In other words, the spent city water is allowed to be slightly acidic after it is used to scrub the exhaust gases. The effectiveness of the wet scrubbing operation is maintained by continuously adding fresh city water to the spent water collection tank 58 and recirculating the water through the scrubbing process as long as the pH value of the spent water is between the values described above.

A major problem in the operation of the exhaust gas conduit in connection with the wet scrubber shown in FIG. 2 has been observed. The problem occurs at the outlet end 40 of the exhaust gas conduit 34, specifically on the inside wall 36 of the outlet end 40 immediately adjacent to the inlet port 20 on the wet scrubber 26. As previously described, the walls of the stainless steel exhaust gas conduit 34 are heated by heaters 44 to maintain the walls at an elevated temperature such that deposition of solids on the inside wall 36 can be avoided. However, at the interface between the outlet end 40 of the exhaust gas conduit 34 and the inlet port 20 of the wet scrubber 26, there is a substantial temperature drop due to the fact that the city water spray 48 inside the wet scrubber chamber 68 substantially drops the chamber temperature to at or below room temperature. The lower temperature region at the interface between the inlet port 20 and the outlet end 40 therefore provides a location for the deposition of solids precipitated from the exhaust gases 38. The solid deposit 64, shown in FIG. 2, accumulates to the stage that the deposit either partially blocks the inlet port 20 or completely blocks it. This creates a serious processing problem in that the exhaust gases 38 can not longer enter the wet scrubber 26 resulting in the need for a complete disassembly of the exhaust gas conduit 34 from the wet scrubber 26 in order to remove the solid deposit 64 from the outlet end 40 of the conduit 34. Such maintenance procedure creates unnecessary down time and therefore greatly reduces the yield of the metal etcher 12.

It is therefore an object of the present invention to provide an exhaust gas conduit for feeding an exhaust gas to a scrubber that does not have the drawbacks or shortcomings of the conventional exhaust gas conduits.

It is another object of the present invention to provide an exhaust gas conduit for feeding an exhaust gas to a scrubber that is equipped with a self-cleaning device mounted inside the conduit body and adjacent to an outlet and of the conduit for dispensing a cleaning solvent to the inside wall of the conduit.

It is a further object of the present invention to provide an exhaust gas conduit for feeding an exhaust gas to a scrubber that is equipped with a self-cleaning device inside the conduit body for spraying a cleaning solvent on the inside wall of the conduit and thus preventing solid deposition thereon.

It is another further object of the present invention to provide an exhaust gas conduit for feeding an exhaust gas to a wet scrubber by providing a self-cleaning device inside the conduit and mounted to a 90° bent at an outlet end of the conduit such that solid deposition at the outlet end can be eliminated or minimized.

It is yet another object of the present invention to provide a wet scrubber for treating an exhaust gas from a process chamber by equipping the wet scrubber with an exhaust gas conduit for feeding an exhaust gas to the wet scrubber wherein the exhaust gas conduit is equipped with a self-cleaning device for spraying a cleaning solvent on the inside wall of the conduit and thus preventing solid formation on the inside wall and any possible blockage of the conduit.

It is still another object of the present invention to provide a wet scrubber for treating an exhaust gas from a process chamber by providing a self-cleaning device inside an exhaust gas conduit consists of a spray nozzle and a cleaning solvent conduit such that a cleaning solvent can be sprayed from the spray nozzle to prevent solid deformation inside the conduit.

It is still another further object of the present invention to provide a method for preventing solid deposition in an exhaust gas inlet port to a wet scrubber by attaching an exhaust gas conduit to the exhaust gas inlet port which is equipped with a self-cleaning device inside the conduit for spraying a cleaning solvent such that solid deposition inside the conduit passage can be substantially eliminated.

It is yet another further object of the present invention to provide a method for preventing solid deposition in an exhaust gas inlet port to a wet scrubber by installing a self-cleaning device on the inside of the conduit which has at least one spray head adapted for spraying a cleaning solvent onto an inside wall of the conduit such that any deposition of solids on the inside wall can be avoided.

SUMMARY OF THE INVENTION

In accordance with the present invention, an exhaust gas conduit for feeding an exhaust gas to a scrubber that is equipped with a self-cleaning device mounted inside the conduit for dispensing a cleaning solvent on an inside wall of the conduit and thus preventing solid deposition thereon is provided.

In a preferred embodiment, an exhaust gas conduit for feeding an exhaust gas to a scrubber is provided which has a conduit body equipped with an inlet end in fluid communication with an outlet end, the inlet end is adapted for receiving an exhaust gas from a process chamber and the outlet end is adapted for delivering the exhaust gas to an inlet port of a scrubber, and a self-cleaning device mounted inside the conduit body that is juxtaposed to the outlet end of the conduit body adapted for dispensing a cleaning solvent onto an inside wall of the outlet end of the conduit body and thus preventing solid deposition thereon.

The present invention is further directed to a wet scrubber for treating an exhaust gas from a process chamber which includes a scrubber body that has an exhaust gas inlet port, an exhaust gas outlet port, a solvent spray device and a solvent collection device, and an exhaust gas conduit for feeding an exhaust gas to the exhaust gas inlet port, the exhaust gas conduit further includes a self-cleaning device mounted inside a conduit body of the exhaust gas conduit that is juxtaposed to an outlet end of the conduit body adapted for dispensing a cleaning solvent onto an inside wall of the outlet end of the conduit body and thus preventing any solid deposition thereon.

The present invention is further directed to a method for preventing solid deposition in an exhaust gas inlet port to a wet scrubber which can be carried out by the operating steps of first providing a wet scrubber that is equipped with an exhaust gas inlet port, an exhaust gas outlet port, a solvent spray device and a solvent collection device, then attaching an exhaust gas conduit to the exhaust gas inlet port, the exhaust gas conduit is equipped with a self-cleaning device mounted inside a conduit body juxtaposed to an outlet end of the conduit body, then flowing an exhaust gas from a process chamber into the exhaust gas inlet port through the exhaust gas conduit, and then dispensing a cleaning solvent through the self-cleaning device and spraying the solvent onto an inside wall of the outlet end of the conduit body to substantially prevent the formation of solid depositions on the inside wall.

BRIEF DESCRIPTION OF THE DRAWINGS

These and other objects, features and advantages of the present invention will become apparent from the following detailed description and the appended drawings in which.

DETAILED DESCRIPTION OF THE PREFERRED EMBODIMENT

Figure 1:
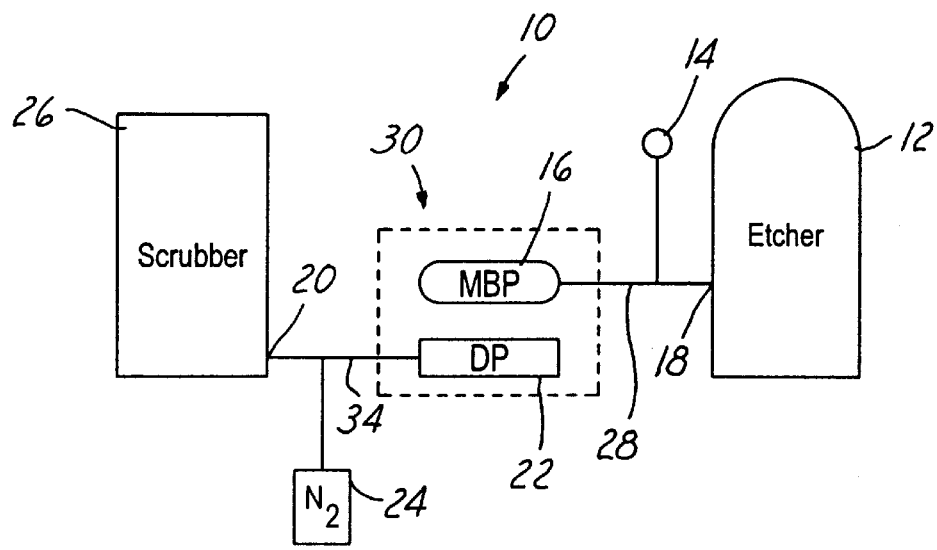
FIG. 1 is a schematic illustrating a conventional semiconductor fabrication system including an etcher, a main booster pump, a dry pump and a wet scrubber.
Figure 2:
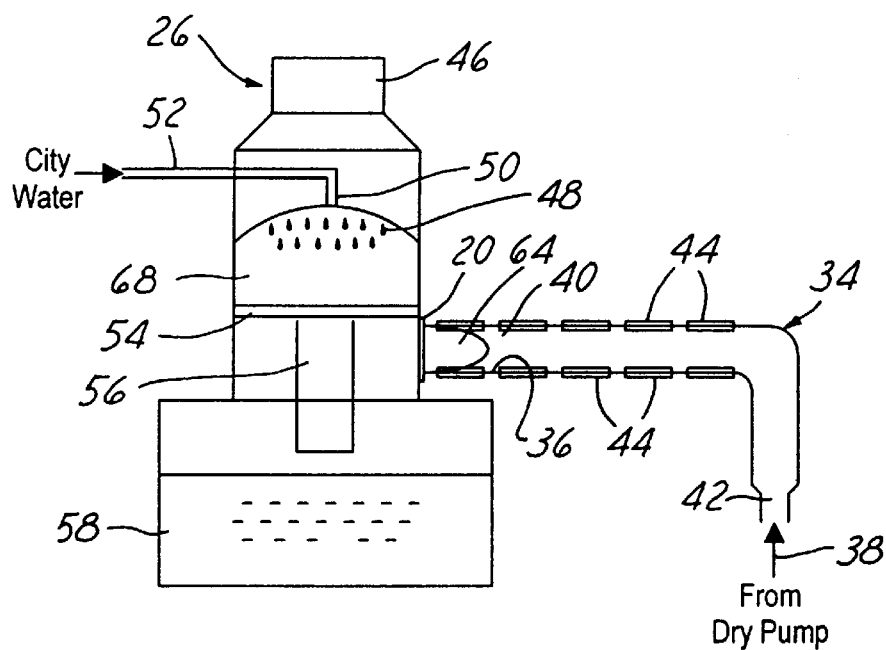
FIG. 2 is a schematic illustrating the exhaust gas conduit and the wet scrubber of FIG. 1 and the problem caused in the normal operation of the system.

The present invention discloses an exhaust gas conduit for feeding an exhaust gas to a scrubber, preferably a wet scrubber, that utilizes a self-cleaning device mounted inside the exhaust gas conduit juxtaposed to an outlet end of the conduit body for dispensing a cleaning solvent onto an inside wall of the outlet end of the conduit body and therefore preventing a solid deposition formed thereon.

The present invention also discloses a wet scrubber for use in treating an exhaust gas from a process chamber that utilizes an exhaust gas conduit for feeding an exhaust gas to the wet scrubber through an exhaust gas inlet port, wherein the exhaust gas conduit is equipped with a self-cleaning device mounted inside the conduit body adjacent to an outlet end of the conduit body for dispensing a cleaning solvent onto the inside wall of the outlet end and thus preventing solid deposition on the inside wall.

The present invention further discloses a method for preventing solid deposition on an exhaust gas inlet port of a wet scrubber by attaching an exhaust gas conduit to the exhaust gas inlet port on the scrubber which is equipped with a self-cleaning device mounted inside the conduit immediately adjacent to an outlet end of the conduit and then flowing a cleaning solvent through the self-cleaning device and spraying the solvent onto an inside wall of the outlet end of the conduit body to prevent the formation of any solid deposition on the inside wall.

The present invention novel method and apparatus can be used on a wet scrubber or on a dry scrubber, and more suitably on a wet scrubber. When the present invention apparatus is mounted to a dry scrubber, the scrubber should be equipped with a cleaning solvent collection device for collecting the cleaning solvent that is dispensed from the self-cleaning device. When the present invention apparatus is used in conjunction with a wet scrubber, the cleaning solvent used through the self-cleaning device can be conveniently a city water supply. To facilitate the mounting or supporting of the present invention self-cleaning device inside an exhaust gas conduit, the exhaust gas conduit can be provided with a 90° bend at the outlet end adjacent to the wet scrubber such that a spray head or the like can be advantageously mounted to the wall of the conduit. The present invention self-cleaning device may include a spray nozzle and a cleaning solvent conduit for transporting a cleaning solvent to the nozzle, or alternatively, may include two spray nozzles arranged in an upstream/downstream relationship in the conduit to more thoroughly clean the inside wall of the conduit.

The present invention method and apparatus can be used to substantially eliminate the deposition of a solid reaction product that is normally formed at the inlet port of a wet scrubber based on two causes. First, at the interface between the inlet port of the wet scrubber and the outlet end of an exhaust gas conduit, the exhaust gas conduit is not heated and furthermore, heat is transferred away by the inlet port on the wet scrubber which is kept at a substantially lower temperature, the lower temperature on the inside wall at the interface therefore provides ample opportunities for forming solid deposits from the unreacted reactant gases contained in the exhaust gas. Secondly, at the interface between the inlet port of the wet scrubber and the outlet end of the exhaust gas conduit, there is a high moisture content due to the wet interior of the scrubber chamber. The moisture reacts with certain reactive components in the exhaust gases thus forming solid deposits on the inside wall of the exhaust gas conduit at an interface with the wet scrubber. By utilizing the present invention novel self-cleaning device mounted inside the exhaust gas conduit, and continuously spraying a cleaning solvent onto the inside wall of the conduit, the solid formation on the inside wall can be substantially eliminated.

Figure 3:
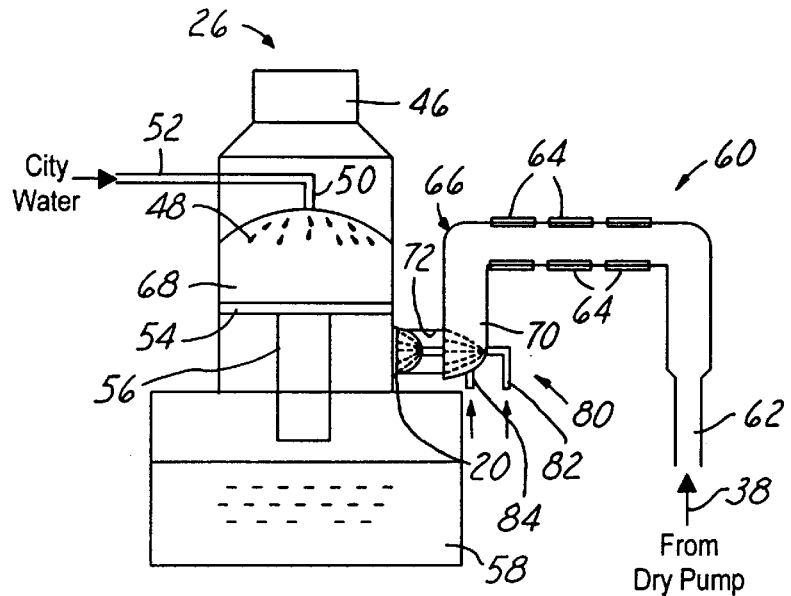
FIG. 3 is a schematic illustrating the present invention exhaust gas conduit connected to a wet scrubber.

Referring now to FIG. 3, wherein a present invention exhaust gas conduit 60 mounted to a wet scrubber 26 is shown. The exhaust gas conduit 60 consists of an inlet portion 62, tape heaters 64, a 90° bend 66, an outlet end 70 and an inside wall 72 at the outlet end 70. The exhaust gas conduit 60 is connected to the wet scrubber 26 at an inlet port 20 on the scrubber. The wet scrubber 26 is constructed of the inlet port 20, an exhaust outlet port 46, a spray head 50, a solvent feed conduit 52, a spend solvent collector 54, a spend solvent conduit 56 and a spend solvent collection tank 58.

Figure 4:
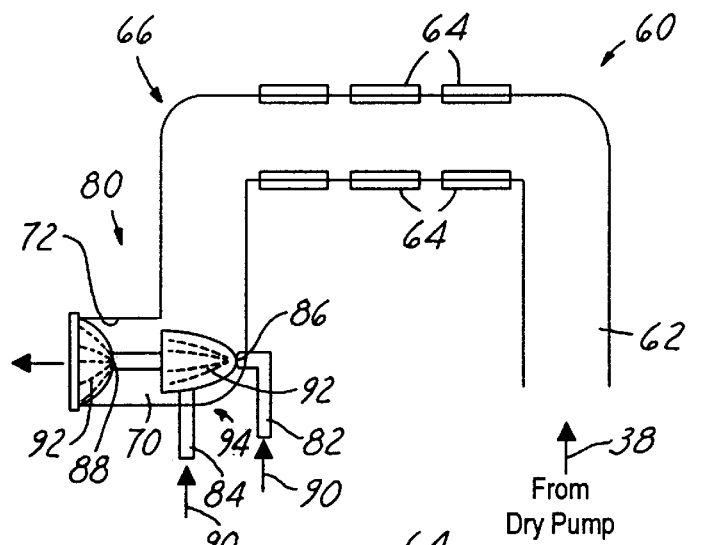
FIG. 4 is a partial, enlarged view of the present invention exhaust gas conduit shown in FIG. 3.

As shown in FIG. 3 and in an enlarged, detailed view in FIG. 4, the present invention novel self-cleaning device 80 is constructed of cleaning solvent conduits 82, 84, and spray heads 86, 88 with a cleaning solvent 90 supplied from a cleaning solvent reservoir (not shown). A solvent spray 92 is injected into the outlet end 70 of the exhaust gas conduit 60. The solvent spray 92 is conducted in a continuous fashion during the flow of the exhaust gases through the exhaust gas conduit 60 such that any solid deposition formed on the inside wall 72 (which is at a lower temperature than the remainder of the exhaust conduit 60) by a reaction between the moisture from the wet scrubber chamber 60 and the unreacted gas components in the exhaust gases 38 can be avoided. A suitable solvent 90 for forming the spray 92 can be conveniently a city water supply. Any other suitable solvents, including those of non-aqueous based solvents, can also be used as long as the solvent can effectively dissolve any solid deposits formed on the inside wall 72 of the conduit 60.

In the preferred embodiment shown in FIG. 4, the present invention exhaust gas conduit 60 is provided with two 90° bends 66 and 94. The bend portion 94 facilitates the installation of the spray heads 86, 88 and the cleaning solvent conduits 82, 84. It should be noted that the 90° bend portions 66 or 94 are not absolutely necessary. The present invention self-cleaning device 80 can be mounted by suspension means inside the exhaust gas conduit 60 even when the conduit is a straight conduit.

The present invention novel self-cleaning device 80 when used in conjunction with a metal etcher which discharges an exhaust gas containing a high concentration of $Cl_2$ or $BCl_3$, can effectively reduce or eliminate solid depositions from occurring on the inside wall of the exhaust conduit near the wet scrubber. The acidity/alkality of the spent solvent tank is continuously monitored by a monitoring device and fresh water is added to the tank such that the pH value of the scrubber solvent, i.e., city water, is maintained at between about 6 and about 6.3. Within such acidity range, the wet scrubber can be effectively used to wash out the acidic or caustic components in the exhaust gases and thereby allowing substantially cleaned exhaust gases to be sent to a factory exhaust system.

Figure 5:
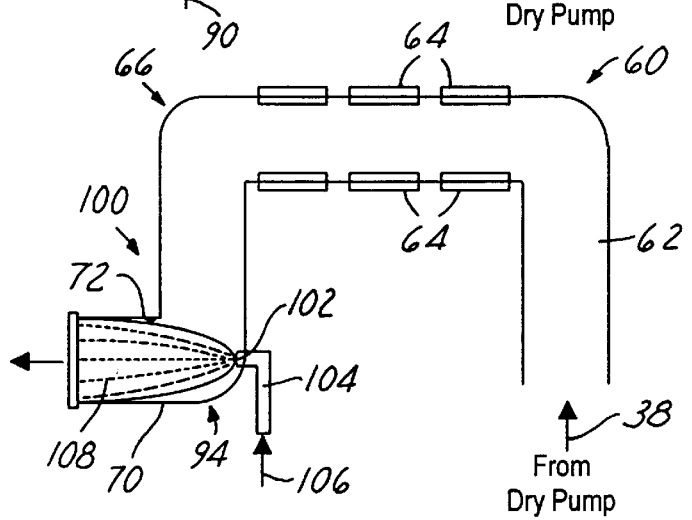
FIG. 5 is a partial, enlarged view of an alternate embodiment of the present invention exhaust gas conduit shown in FIG. 3.

An alternate embodiment of the present invention self-cleaning device 100 is shown in FIG. 5. The exhaust gas conduit 60, provided with two 90° bend sections 66 and 94, is equipped with a self-cleaning device 100 of a single spray head 102, a single cleaning solvent conduit 104 for spraying a cleaning solvent 106 into a spray pattern 108 for washing the inside wall 72 of the outlet end 70 of the conduit. The single spray head 102 may be adequately used when a higher spray pressure of the cleaning solvent 106 is utilized such that a larger spray pattern of the spray 108 can be obtained to sufficiently clean the inside wall 72. The present invention alternate embodiment of the self-cleaning device 100 can be constructed in a simpler manner than that disclosed in the preferred embodiment which consists of two spray nozzles. The alternate embodiment self-cleaning device 100 can also be manufactured at a lower manufacturing cost since only one spray nozzle and only one cleaning solvent conduit is necessary. It should be noted that heating tapes 64 are still desirable for coverage of the long horizontal section of the exhaust conduit 60 such that the possibility of solid deposition is substantially eliminated. It should further be noted that, by utilizing the present invention novel self-cleaning device 80 or 100, the moisture escaped from the wet scrubber chamber is substantially captured by the cleaning solvent spray such that the moisture does not have a chance to propagate toward the portion of the conduit away from the outlet end 70.

The present invention novel method and apparatus have therefore been amply demonstrated in the above descriptions and the appended drawings of FIGS. 3~5. It should be noted that, while in the present invention preferred and alternate embodiments, a metal etcher is used in the illustration as the process chamber, the present invention novel method and apparatus can be utilized on any other process chambers as long as an exhaust gas that contains reactive component which may form solid depositions in the conduit is encountered. It should also be noted that, while in the present invention preferred and alternate embodiments, a cleaning solvent of city water for the self-cleaning device is illustrated, any other suitable cleaning solvent including those of the non-aqueous type can be equally used to obtain the present invention desirable results.

While the present invention has been described in an illustrative manner, it should be understood that the terminology used is intended to be in a nature of words of description rather than of limitation.

Furthermore, while the present invention has been described in terms of a preferred and an alternate embodiment, it is to be appreciated that those skilled in the art will readily apply these teachings to other possible variations of the inventions.

The embodiment of the invention in which an exclusive property or privilege is claimed are defined as follows:

What is claimed is:

1. An exhaust gas conduit for feeding an exhaust gas to a scrubber comprising:

a conduit body having an inlet end in fluid communication with an outlet end, said inlet end being adapted for receiving an exhaust gas from a process chamber and said outlet end being adapted for delivering said exhaust gas to an inlet port of a scrubber, said conduit body further having a 90° bend at said outlet end for facilitating the mounting of a self-cleaning device, and the self-cleaning device mounted inside the conduit body juxtaposed to said outlet end of the conduit body adapted for dispensing a cleaning solvent on an inside wall of the outlet end of the conduit body thus preventing the formation of a solid deposition thereof.

2. An exhaust gas conduit according to claim 1, wherein said scrubber further comprises a cleaning solvent collection device for collecting said cleaning solvent dispensed from said self-cleaning device.

3. An exhaust gas conduit according to claim 1, wherein said scrubber is a wet scrubber or a dry scrubber.

4. An exhaust gas conduit according to claim 1, wherein said scrubber is a wet scrubber utilizing city water for scrubbing.

5. An exhaust gas conduit according to claim 1, wherein said self-cleaning device comprises a spray nozzle and a cleaning solvent conduit for transporting a cleaning solvent to said nozzle.

6. An exhaust gas conduit according to claim 1, wherein said self-cleaning device dispenses a spray of water on the inside wall of said outlet end of the conduit body for preventing a deposition of solids thereon.

7. A wet scrubber for treating an exhaust gas from a process chamber comprising:

a scrubber body having an exhaust gas inlet port, an exhaust gas outlet port, a solvent spray device and a solvent collection device, and an exhaust gas conduit for feeding an exhaust gas to said exhaust gas inlet port, said gas conduit comprises a self-cleaning device mounted inside a conduit body of said exhaust gas conduit juxtaposed to an outlet end of the conduit adapted for dispensing a cleaning solvent on an inside wall of the outlet end of the conduit body thus preventing solid deposition thereon said conduit body having a 90° bend at said outlet end for facilitating the mounting of said self-cleaning device.

8. A wet scrubber according to claim 7, wherein said self-cleaning device comprises a spray nozzle and a cleaning solvent conduit for transporting a cleaning solvent to said nozzle.

9. A wet scrubber according to claim 7, wherein said wet scrubber treats an exhaust gas from a semiconductor process machine by spraying a solvent from said solvent spray device for dissolving toxic components in said exhaust gas.

10. A wet scrubber according to claim 10, wherein said solvent sprayed is water.

11. A wet scrubber according to claim 7, wherein said self-cleaning device comprises two spray nozzles mounted in an upstream/downstream relationship inside said conduit body at said outlet end of the exhaust gas conduit.

12. A method for preventing solid deposition in an exhaust gas inlet port to a wet scrubber comprising the steps of:

providing a wet scrubber having an exhaust gas inlet port, an exhaust gas outlet port, a solvent spray device and a solvent collection device, attaching an exhaust gas conduit to said exhaust gas inlet port, said exhaust gas conduit being equipped with a self-cleaning device mounted inside a conduit body juxtaposed to an outlet end of the conduit body, said conduit body having a 90° bend at said outlet end for facilitating the mounting of said self-cleaning device, flowing an exhaust gas from a process machine into said exhaust gas inlet port through said exhaust gas conduit, and dispensing a cleaning solvent through said self-cleaning device and spraying said solvent on an inside wall of the outlet end of the conduit body thus preventing the formation of solid deposition on said inside wall.

13. A method for preventing solid deposition according to claim 12 further comprising the step of collecting said cleaning solvent dispensed from said self-cleaning device by said solvent collection device in said wet scrubber.

14. A method for preventing solid deposition according to claim 12 further comprising the step of flowing an exhaust gas from a semiconductor process machine containing toxic components into said exhaust gas inlet port of said wet scrubber.

15. A method for preventing solid deposition according to claim 12 further comprising the step of dispensing water through said self-cleaning device and spraying said water on an inside wall of the outlet end of the conduit body.

16. A method for preventing solid deposition according to claim 12 further comprising the step of equipping said self-cleaning device with at least one spray head adapted for spraying a cleaning solvent onto said inside wall of the outlet end of the conduit body.

17. A method for preventing solid deposition according to claim 12, wherein said step of spraying a cleaning solvent on said inside wall of the outlet end of the conduit body is carried out by a spray nozzle.

* * * * *